0
UNITED STATES PATENT OFFICE 2,377,309

DRILLING MUD

Donald Edgar Butler, John F. Herold, and Vernon B. Zacher, Ventura, Calif., assignors to Tide Water Associated Oil Company, a corporation of Delaware No Drawing. Application February 14, 1944, Serial No. 522,364

4 Claims. (Cl. 252—8.5)

This invention relates to drilling muds.

In drilling oil and gas wells by the rotary drilling process it is common practice to circulate a mud-laden fluid downwardly through the drill stem of the drilling bit, across the face of the bit and upwardly through the drill hole. The circulating drilling fluid known as "mud" serves to cool and lubricate the bit, to carry cuttings to the surface, to seal off the sides of the well, to prevent loss of water from the drilling fluid into adjacent strata, to support the well wall, to prevent blow-outs due to high-pressure gas, and other purposes. The mud issuing from the well is passed through a settling tank, trough or ditch wherein the drill cuttings are separated, and the mud is then again pumped down the drill stem. It is thus recirculated many times.

A satisfactory drilling mud must possess certain definite characteristics and it must have them at ordinary atmospheric temperatures encountered in the oil fields, and also at the high temperatures encountered deep down in the earth. It must have sufficient fluidity to permit pumping through the system and yet be of sufficient viscosity to carry the drill cuttings to the surface and prevent their settling around the bit and sticking it should circulation be stopped temporarily. Muds having thixotropic properties are employed to satisfy these requirements. An ideal thixotropic mud is one which on agitation by pumping or otherwise, has a relatively low viscosity and is free flowing, but when agitation is stopped, gradually sets or gels to a higher viscosity fluid. The cycle of viscosity change can be repeated many times.

This gelling action is slow enough to permit the cuttings to settle 2 or 3 feet before the gel structure is strong enough to support them. Such muds contain large amounts of colloidal material in the form of hydrated clay particles. Native clays are employed for making up drilling muds, if possible, but since they do not always contain the proper amount of colloidal material it is sometimes necessary to add a similar hydratable colloidal clay to build up the mud to the desired viscosity and thixotropic character. Soaps, boiled starch, gelatin and similar colloidal materials have been employed for this purpose.

The drilling mud should also be of sufficient specific gravity to furnish a liquid column of high hydrostatic head in the well to prevent blow-outs of high-pressure gas sometimes encountered in the drilling operation. The specific gravity of the mud may be increased and the danger of blow-outs correspondingly decreased by weighting the mud with insoluble materials of high density such as barytes, ferric oxide, litharge, zinc dust, metal filings, and similar materials. Our copending application filed on the same date hereof shows the use of barium carbonate to accomplish this purpose.

The mud should also have wall-building properties. It should form on the walls of the well a thin, closely knit, impervious filter-cake wall to prevent loss of water by seepage from the drilling fluid to the adjacent strata. Loss of water from the drilling fluid through this mud wall may result in serious consequences. Absorption of water in oil sands forces away the oil and blocks it off, sometimes permanently, from flowing into the well when it is put into production. Water from the drilling fluid may also dissolve cementing materials and cause caving of the earth, or in shale formations it may cause hydration and swelling of the shale with resulting heaving. The mud wall also serves to seal off water sands and minor oil in gas sands.

Magnesium ions are often present in drilling muds, from one source or another, such as, particular formations, certain clays comprising drilling mud, formation waters, and local water used for mud mixing, and their presence causes the mud to have undesirable high viscosity characteristics and quick jelling properties that make the mud difficult to circulate. It is to this problem that the present invention provides a solution.

Attempts to change a characteristic of the mud frequently result in making an unwanted change in one or more of the other characteristics, and it is thus not a simple matter to change one or more of the characteristics at will to produce a mud which has each of the desired characteristics in the desired degree.

Objects of this invention include the reduction or avoidance of the undesired characteristics of the mud which are due to the presence of magnesium ions, to provide a method for the removal of such ions by precipitating them without substantially affecting desirable mud characteristics, to provide a method for converting a mud of undesirable high viscosity and quick gelling characteristics into a mud which is easy to circulate, and to provide out of a mud with a deleterious magnesium content a mud with substantially no magnesium content. Other objects and advantages will be apparent from the description and the claims.

The problem solved by the present invention is in taking a drilling fluid known to have magnesium present and having an undesirably high viscosity and quick gelling characteristic, and giving the fluid lower viscosity and a proper gelling time. This is done by the addition to the mud of a proper amount of sodium metaborate ($NaBO_2$), which will very materially decrease and in most cases avoid altogether the bad effects of the magnesium ions. The sodium metaborate removes the magnesium as the insoluble compound, magnesium metaborate. Other soluble metaborates which in solution do not form cations which will adversely affect the characteristics of the mud, may also be used.

The theoretical dosage based on theoretical, reacting, molecular weights would be as follows:

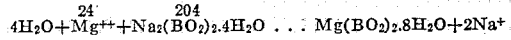

$$4H_2O + Mg^{++} + Na_2(BO_2)_2 \cdot 4H_2O \ldots Mg(BO_2)_2 \cdot 8H_2O + 2Na^+$$

Every lb. of $Mg^{++}$ required 8.5# $Na_2(BO_2)_2$.

Ordinary range of $Mg^{++}$ contained in contaminated muds is from .002#/bbl. to 0.5#/bbl., thus requiring .017#/bbl. to .425#/bbl. $Na_2(BO_2)_2$.

Actual treatment in the well has indicated it is best to use double the theoretical amount of soluble metaborate required to precipitate as metaborate all of the magnesium ions, and offers a good rule to follow, although this amount may be varied considerably.

Table A gives the results of ion tests on various mud filtrates containing magnesium.

Table A

| Type mud | Am't Mg before treatment | Am't Mg after treatment | Chemical used |
|---|---|---|---|
| 1 Ventura reclaimed. | .024+lb./bbl. | None | 1#/bbl. $NaBO_2$ |
| 2 Hiko "HiWate" | .024+lb./bbl. | .002 | 1#/bbl. $NaBO_2$ |
| 3 Hiko regular | .024+lb./bbl. | None | 1#/bbl. $NaBO_2$ |

Table B shows the effect on mud characteristics of the addition of sodium metaborate alone, as well as in conjunction with other substances used to control other mud characterics.

Table B

| | Type mud | Chemical used | Wt. | Visc. | Water loss | Filter cake |
|---|---|---|---|---|---|---|
| 1 | Ventura reclaimed | None | 70½ | 55 | 22 | 4 |
| 2 | do | 1#/bbl. $NaBO_2$ | 70 | 35 | | |
| 3 | do | 2#/bbl. $NaBO_2$ | 70 | 39 | | |
| 4 | do | 1#/bbl. $NaBO_2$ + 1#/bbl. oxalic acid | 73 | 29 | 19 | 2.5 |
| 5 | do | 1#/bbl. each of $NaBO_2$, and lignin | 72½ | 27 | 12 | 1.5 |
| 6 | Hiko regular | None | 82.5 | 32 | | |
| 7 | | 1#/bbl. $NaBO_2$ | 82.5 | 30 | | |

The sodium metaborate used has the conventional degree of hydration.

The ligin (added in the 5th sample) as taught in Patent No. 2,212,108, patented August 20, 1940, is valuable in reducing water loss. Its addition in that instance was valuable because getting rid of the magnesium ion and reduction of viscosity and gel strength does not materially affect the water loss. Oxalic acid, the use of which is taught in our copending application Ser. No. 522,366, is compatible with the metaborates and further lowers the viscosity and the filter cake thickness. Other deflocculants to use with sodium metaborate, if it is desired to further reduce the viscosity and gel strength are sodium carbonate, sodium silicate, quebracho, etc. The metaborates are a specific cure for magnesium removal.

The invention claimed is:

1. Aqueous drilling mud modified by the addition thereto of sufficient water-soluble metaborate to precipitate substantially all magnesium present soluble in the mud, the positive ions of the metaborate not substantially decreasing the desired characteristics of the mud.

2. Aqueous drilling mud modified by the addition thereto of water-soluble metaborate, the positive ions of the metaborate not substantially decreasing the desired characteristics of the mud, the amount of the added metaborate being about double the chemical equivalent calculated to precipitate all of the magnesium present which is soluble in the mud.

3. Aqueous drilling mud modified by the addition thereto of about double the chemically equivalent amount of sodium metaborate required to precipitate magnesium ions present in the mud.

4. The method of treating aqueous drilling mud having undesired characteristics due to the presence of ions which form insoluble metaborates and impart undesired characteristics to the mud, which comprises adding to the mud sufficient metaborate ions to precipitate most of said first mentioned ions.

DONALD EDGAR BUTLER.
JOHN F. HEROLD.
VERNON B. ZACHER.